3,034,931
SMOKING PRODUCTS AND METHODS OF PRODUCING SAME
Julius E. Kiefer, 3951 N. Farwell Ave., Milwaukee 11, Wis.
No Drawing. Filed Nov. 16, 1959, Ser. No. 852,984
12 Claims. (Cl. 131—2)

The present invention relates to materials and products to be used for smoking purposes, as in cigarettes, cigarillos, cigars, and pipes, and to methods of producing the same.

I have found that the leafy or non-woody portions of sagebrush, when suitably processed, can be used as a satisfactory substitute for smoking tobacco. This sagebrush material contains desirable constituents, such as gums and resins, which upon burning of the material impart a pleasant aroma and taste to the smoke. The material is free of nicotine and other alkaloids and is abundantly available.

Sagebrush is a shrub of the genus Artemisia and grows in profusion on the western plains and basins of the United States and Canada. There are numerous species of which the most common variety is the big sagebrush, *Artemisia tridentata*. Some of the other varieties are *A. cana*, *A. nova*, and *A. frigida*.

An object of the invention is to provide a smoking product comprising dried sagebrush material having physical characteristics somewhat similar to those of natural tobacco.

Another object is to provide a smoking product of this character in which the sagebrush material is toasted to improve the smoking qualities and to impart thereto a brown color.

Still another object is to provide a smoking product in which the dried sagebrush material is combined with other materials to modify or enhance the taste, aroma and color thereof and to further improve the burning qualities.

A more specific object is to modify the taste, aroma and color of the dried sagebrush material by combining therewith minor proportions of flavoring and coloring agents, such as paprika and turmeric.

Another specific object is to provide a smoking mixture comprising dried sagebrush material and a minor proportion of dried, comminuted or shredded citrus peel material, such as lemon peel.

A further object is to provide improved methods for processing the smoking product and the sagebrush material.

The invention further consists in the several features hereinafter described and claimed.

In preparing a smoking product in accordance with the invention, the leafy or non-woody material of sagebrush, preferably *Artemisia tridentata*, is dried and toasted, the material assuming a generally uniform dark brown color. The drying may be effected in various ways as by the flue process, or by heating the material on a moving stainless steel belt or other support, or by subjecting the material to infra-red radiation, or by combinations of these methods. Before, during, or after the toasting operation, the material is subjected to a flattening operation, as by passing the material between rollers to compress and break down the leaf ribs or veins and the leaf stems. This may be effected by the use of flattening machines, such as are used in tobacco processing. The leafy material may become brittle during the heating operation, but after cooling of the material, moisture will be absorbed by the material to restore pliability. The material is shredded before or after the drying operation.

The sagebrush material is also treated or mixed with one or more various other ingredients for modifying or enhancing the color, flavor, aroma, and burning qualities of the material. Two such ingredients are paprika and turmeric either or both of which are dispersed through the sagebrush material, preferably simultaneously with the drying or toasting operation. The paprika will impart a reddish-brown color to the base material, while turmeric will impart a yellowish color, so as to simulate the colors of various tobaccos varying from dark brown to bright. The paprika and turmeric will enhance the aroma and flavor of the smoking product and produce a slow uniform burn.

A preferred method of applying the paprika and turmeric consists in providing a thick aqueous slurry thereof and thoroughly mixing the slurry with the sagebrush material, the mixture being then dried and toasted. The paprika or turmeric or a mixture thereof may constitute 0.5 to 5% of weight of the sagebrush material.

The toasted sagebrush material may also be treated with small quantities of one or more so-called tobacco flavors and humectants of conventional type commonly used for tobacco, these added materials being suitably applied as by a spraying operation. The flavors often include a sweetening agent, such as maple sugar or syrup, and the humectant may consist of glycerine or diethylene glycol. The humectant may constitute about 2 to 4% of the dried base material. The flavor is added in suitable minor proportions as in treating tobacco.

Various other flavor additions that may be used are botanicals such as powdered bay leaves and mustard, fruit flavors such as strawberry flavor, and imitation rum flavor.

Another advantageous addition is comminuted dried citrus fruit peel or rind, such as lemon peel, orange peel, lime peel and grapefruit peel. The peel is grated or shredded in its natural or moist condition and is then dried by a toasting heat, forming small, thin, irregular shreds resembling shreds of tobacco. The toasted peel shreds are reddish to yellowish in color and impart a pleasing mild flavor and aroma to the mixture during smoking, diluting and modifying the sagebrush resins. The mixture burns smoothly and evenly and produces a uniform white ash. The shredded peel may constitute 1 to 20% of the smoking mixture.

While the treated sagebrush smoking product of the invention is preferably used as such to provide a smoke devoid of nicotine and other alkaloids, it may also be mixed in various proportions with natural smoking tobacco to reduce the nicotine content thereof, the sagebrush material blending well with the tobacco and contributing its own flavor and aroma. The shredded dried citrus fruit peel may also be used as a tobacco additive for the same purposes.

The sagebrush material used in producing the smoking product of the invention is relatively inexpensive and is easily and quickly processed, there being no need for the protracted storage periods required in processing tobacco. The processed smoking material or product can readily be formed into cigarettes, using the same machinery and equipment commonly used in making cigarettes of tobacco. The material or product can also be used in making cigarillos, cigars, and pipe mixtures.

I claim:

1. A smoking product comprising toasted leafy sagebrush material.

2. A smoking product comprising toasted leafy portions of *Artemisia tridentata*.

3. A smoking product comprising toasted leafy sagebrush material combined with a minor proportion of a combustible flavoring material.

4. A smoking product comprising toasted leafy sagebrush material impregnated with a minor proportion of paprika.

5. A smoking product comprising toasted leafy sagebrush material impregnated with a minor proportion of turmeric.

6. A smoking product comprsing toasted leafy sagebrush material combined with a minor proportion of dried comminuted citrus peel.

7. A smoking product comprising toasted leafy sagebrush material combined with a minor proportion of dried shredded citrus peel.

8. A smoking product comprising toasted leafy sagebrush material combined with a minor proportion of dried comminuted lemon peel.

9. A smoking mixture including toasted comminuted leafy sagebrush material and dried, toasted comminuted citrus peel.

10. A smoking product comprising toasted leafy sagebrush material in the form of a cigarette.

11. A smoking composition comprising a mixture of toasted comminuted leafy sagebrush material and tobacco.

12. A smoking product comprising a mixture of toasted comminuted leafy sagebrush material and tobacco combined in the form of a cigarette.

References Cited in the file of this patent

UNITED STATES PATENTS

| | | |
|---|---|---|
| 1,680,860 | Chisholm | Aug. 14, 1928 |
| 2,576,021 | Koree | Nov. 20, 1951 |

FOREIGN PATENTS

| | | |
|---|---|---|
| 139,745 | Great Britain | Nov. 15, 1917 |
| 29,776 | Norway | Sept. 18, 1917 |